United States Patent [19]

Hoffert et al.

[11] Patent Number: 5,046,119

[45] Date of Patent: Sep. 3, 1991

[54] METHOD AND APPARATUS FOR COMPRESSING AND DECOMPRESSING COLOR VIDEO DATA WITH AN ANTI-ALIASING MODE

[75] Inventors: Eric M. Hoffert, San Francisco; Gavin S. P. Miller, Mountain View, both of Calif.; Lee S. Mighdoll, Chagrin Falls, Ohio; Stephanie L. Winner, Santa Clara, Calif.

[73] Assignee: Apple Computer, Inc., Cupertino, Calif.

[21] Appl. No.: 495,428

[22] Filed: Mar. 16, 1990

[51] Int. Cl.⁵ .............................................. G06K 9/36
[52] U.S. Cl. ....................................... 382/56; 358/13; 358/78; 358/133
[58] Field of Search ..................... 382/56; 358/13, 133, 358/429, 430, 433, 445, 465, 11, 78; 340/703

[56] References Cited

U.S. PATENT DOCUMENTS

| | | | |
|---|---|---|---|
| 4,319,267 | 3/1982 | Mitsuya et al. | 358/13 |
| 4,580,134 | 4/1986 | Campbell et al. | 340/703 |
| 4,743,959 | 5/1988 | Frederikson | 358/11 |
| 4,797,729 | 1/1989 | Tsai . | |
| 4,816,901 | 3/1989 | Music et al. | 358/13 |
| 4,857,991 | 8/1989 | Music et al. | 358/13 |
| 4,965,754 | 10/1990 | Stansfield et al. | 382/56 |
| 4,965,845 | 10/1990 | Chan et al. | 382/56 |

Primary Examiner—Leo H. Boudreau
Assistant Examiner—David Fox
Attorney, Agent, or Firm—Blakely, Sokoloff, Taylor & Zafman

[57] ABSTRACT

An adaptive compression/decompression method for color video data with an anti-aliasing mode. 4×4 blocks of pixel data are examined to determine which one of four compression techniques should be used on each block. User settable thresholds can be used to shift the types of compression used. Highest compression is obtained when more data is stored in run length blocks of single colors and lowest compression when more data is stored as two colors with a 32-bit bitmap for each 4×4 block. One type of compression used provides anti-aliasing.

26 Claims, 8 Drawing Sheets

FIG _ 1 ADAPTIVE CODING FORMAT (FIRST WORD)

── 2 BITS (TYPE OF COMPRESSION/ENCODING)

FIG _ 2 CODING FOR COMPRESSION/ENCODING

00 → 4X4 PIXEL BLOCK OF ONE COLOR
(16 BITS) →(FIG 1/FIRST WORD)

01 → BLOCKS OF SAME COLOR (RUN LENGTH BLOCKS)
(24 BITS) →(FIG 1/FIRST WORD + 8 BITS OF LENGTH)

10 → BLOCK OF TWO COLORS
(48 BITS) →(FIG 1/FIRST WORD + 16 BITS 2ND COLOR
+ 16 BITS OF BIT MAP)

11 → BLOCK OF FOUR COLORS
(64 BITS) →(FIG 1/FIRST WORD + 16 BITS 2ND COLOR
+ 32 BITS/DOUBLE BITMAP

FIG_4A (PRIOR ART)

FIG_4B (PRIOR ART)

FIG_5A

FIG_5B

FIG_6

Δ = DIFFERENCE BETWEEN COLOR O AND COLOR I

COLOR OE  = COLOR O − ΔK
COLOR IE  = COLOR I + ΔK
COLOR OI  = 2/3 COLOR OE + 1/3 COLOR IE
COLOR II  = 1/3 COLOR OE + 2/3 COLOR IE

FIG_7

$$Y_{BAND\ 0} = 1/2\left(Y_{OE} + Y_{OI}\right)$$

$$Y_{BAND\ 1} = 1/2\left(Y_{OI} + Y_{II}\right)$$

$$Y_{BAND\ 2} = 1/2\left(Y_{II} + Y_{IE}\right)$$

FIG_8 DECOMPRESSING/DECODING METHOD

FIG_11

$$d_Y = |R_X - R_Y| + |G_X - G_Y| + |B_X - B_Y|$$
(SIMPLER METHOD)

$$d^2_Y = |R_X - R_Y|^2 + |G_X - G_Y|^2 + |B_X - B_Y|^2$$
(MORE COMPLEX)

FIG_12

METHOD AND APPARATUS FOR COMPRESSING AND DECOMPRESSING COLOR VIDEO DATA WITH AN ANTI-ALIASING MODE

BACKGROUND OF THE INVENTION

1. Field of the Invention

The invention relates to the field of the compression and decompression of color video digital data.

2. Prior Art

Numerous techniques are known in the prior art for compressing and decompressing digital data. For example, see copending application, entitled VIDEO COMPRESSION ALGORITHM, Ser. No. 441,333, filed 11/22/89, which is a continuation of Ser. No. 084,309, Filed 08/11/87, now abandoned, and assigned to the Assignee of the present invention.

In some instances, the data is compressed in a uniform manner block-by-block or frame-by-frame. That is, by way of example, m bits of compressed data are used to represent each n×n block of pixel data. In other methods, such as the one used in the present invention, the degree of compression is a function of the characteristic of the video data sought to be compressed. Again, by way of example, it is common to represent a plurality of adjacent pixels of the same color.

As will be seen, the present invention teaches an adaptive compression/decompression method which examines the color video data, block-by-block, and then determines the type of compression to be used for each block. One of types of compression used in the present invention is similar to that described in U.S. Pat. No. 4,580,134. In general, this type of compression takes a 4×4 block of pixel data and encodes it into two colors and a 16 bit bitmap. The bitmap on a decompression indicates which of the two colors is to be used for each pixel. In the present invention, this type of compression is extended in a novel manner to provide anti-aliasing for these blocks.

Other prior art known to Applicant is disclosed in "Two Bit/Pixel Full Color Encoding", *Siggraph '86*, No. 4, 1986, beginning at page 215 and U.S. Pat. No. 4,743,959.

SUMMARY OF THE INVENTION

A method for compressing color digital video color data is described. The data is considered in blocks of n×n pixels, for example, in the currently preferred embodiment, in blocks of 4×4 pixels. Two diverse colors for each block are determined. This is done by averaging the colors that are above and below the mean luminance for the block. The two diverse colors are computed in RGB space in the currently preferred embodiment. The difference between these two diverse colors is examined and if it is greater than a first threshold, the block of pixel data is stored by storing at least two colors and an n×n bitmap. On the other hand, if the difference is less than the first threshold, the block of pixel data is stored as a single color without a bitmap.

If the difference between the two diverse colors is greater than a second threshold, then the block of data is stored as two colors and a double bitmap (2n×n bits). On decoding, four colors are used, two of which are computed and the bitmap data used to select one of the four colors for each pixel. This type of compression/decompression provides excellent anti-aliasing.

Where a plurality of adjacent blocks are of the same or close to the same color, the video data for these blocks is stored as a "run block" instruction.

Other aspects of the invented method will be apparent from the following detailed description.

BRIEF DESCRIPTION OF THE DRAWINGS

FIG. 3 is a block diagram used to describe the compression method of the present invention.

DETAILED DESCRIPTION OF THE INVENTION

A method and apparatus for compressing and decompressing color video data is described. In the following description, numerous specific details are set forth such as specific number of bits, etc., in order to provide a thorough understanding of the invention. It will be obvious to one skilled in the art, however, that the present invention may be practiced without these specific details. In other instances, well-known methods and apparatuses have not been set forth in detail in order not to unnecessarily obscure the present invention in detail.

OVERVIEW OF THE PRESENT INVENTION

In the currently preferred embodiment of the present invention, digital color video data, more specifically, 8 bits representing the color red (R), 8 bits representing the color green (G) and 8 bits representing the color blue (B) for a raster scanned display are compressed.

The video data is compressed by one of four techniques one of which provides anti-aliasing. In general, colors are stored as 5 bits of red, 5 bits of green and 4 bits of blue in the currently preferred embodiment. The RGB-compressed data can be stored, transmitted or otherwise manipulated or handled as is commonly done. The present invention also teaches the decompressing of the video data into a form corresponding to its precompressed form. Sometimes in this application and in the prior art literature, compression is referred to as "encoding" and decompression as "decoding".

In the currently preferred embodiment, 4×4 blocks of color pixel data of a raster scanned display are considered as a group for compression. As will be obvious to one skilled in the art, the size of these blocks is not critical to the present invention, and in fact, n×n blocks may be used. The blocks are considered one after the other in the direction of the scan. In order for this to be implemented, buffering is used to store four scan lines of pixel data so that 4×4 blocks can then be considered.

The compressing and decompressing of the present invention may be done using ordinary programming in any one of a plurality of commercially available microprocessors. Alternatively, the compressing/decompressing can be done using specialized hardware such as described in conjunction with FIGS. 9 and 10.

In the presently preferred embodiment, each 4×4 block is first evaluated to determine which of 4 types of compression/encoding should be used. The selection of one of the four types can be influenced by the setting of certain threshold values. These threshold values may be permanently fixed in a system or may be adjusted by a user. These values control the amount of compression which occurs and as would be expected the quality of the display resulting from the decompressed data. Thus, for example, the user can select less compression (more storage space) and a better quality display as opposed to high compression (less storage) and a lower quality display.

ADAPTIVE CODING FORMAT OF THE PRESENT INVENTION

Figure 1:
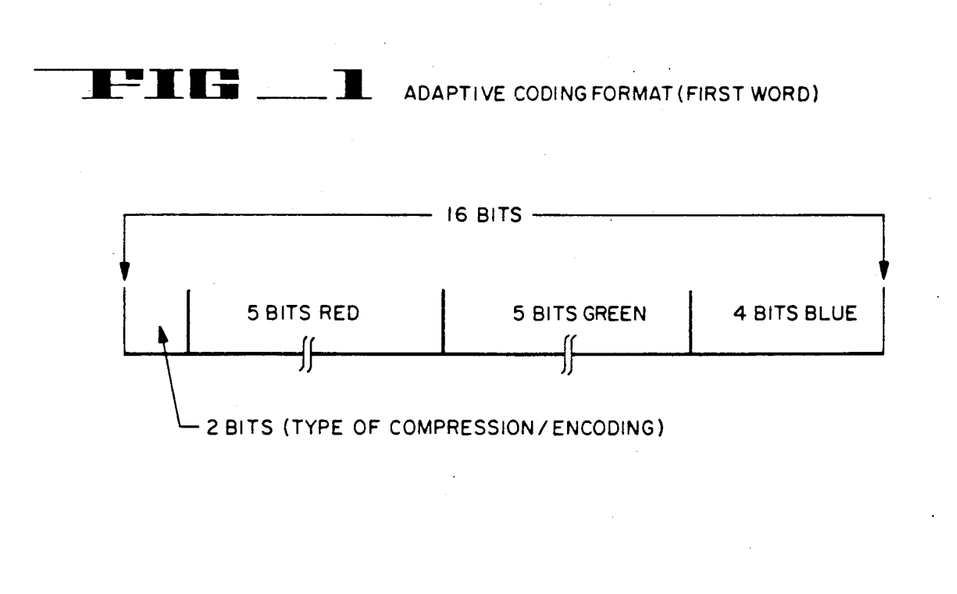
FIG. 1 is a diagram illustrating the formatting used for the compressed data in the currently preferred embodiment of the invented method.

As mentioned, four types of compression/encoding are employed with the present invention. Two bits are used to indicate which of the four types of encoding has been used for each of the 4×4 blocks of pixels. In FIG. 1, a typical 16 bit word used in the currently preferred embodiment is illustrated. This 16 bit word is sometimes referred to as the "first word" since, in some cases, more than one word is used to define a block of pixels. Alternately, for example, a 26 bit word could be used for the first word with 24 bits defining RGB.

TYPES OF COMPRESSION/ENCODING USED IN THE CURRENTLY PREFERRED EMBODIMENT OF THE ADAPTIVE COMPRESSION/ENCODING METHOD AND APPARATUS

In the currently preferred embodiment, as mentioned, 4 types of encoding are employed. The code "00" at the beginning of the 16 bit word of FIG. 1 is used to indicate that a 4×4 block of color pixel data is represented in its compressed form as a single color. For this type of encoding, the RGB data simply follows the code "00" with, as illustrated in FIG. 1, 5 bits representing the color red, 5 bits representing the color green and 4 bits being used to represent the color blue. This type of decoding, as will be discussed, is used when the pixels in a block are all close to the same color.

As will be discussed in greater detail, a plurality of blocks may sequentially occur of the same color. In this event, in addition to the 16 bits shown in FIG. 1, an additional 8 bit word is used to provide a run length instruction. The code "01" at the beginning of the first word indicates a run length instruction. The 14 bits following indicates the color, and the following 8 bits indicate the number of consecutive blocks of the same color. If more than 256 blocks occur of the same color, a second run instruction is used.

The code "01" at the beginning of the first word indicates that a single block of pixels is represented as two "diverse" colors and a 16 bit bitmap. A total of 48 bits is used for this representation and includes the first word as shown in FIG. 1 leading off with the code "10", with the remaining 14 bits of this word indicating the first color. The next 16 bits indicates the second color. Here, three 5 bit words may be used for RGB or one bit may be used for another purpose. Following the second color, a 16 bit word (bitmap) indicates which of the two colors to be used for each of the pixels in the 4×4 block. This coding scheme is described in U.S. Pat. No. 4,580,134.

Figure 4A:
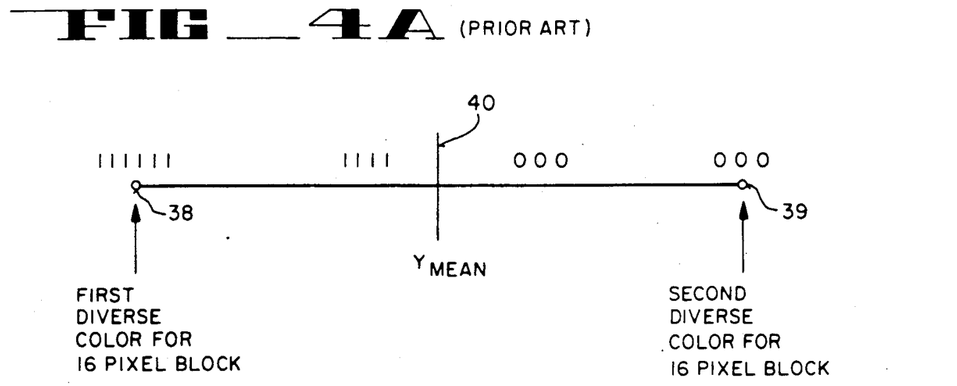
FIG. 4A is a diagram illustrating a prior art method for determining a bitmap where the video data after compression is represented by two colors and a bitmap.
Figure 4B:
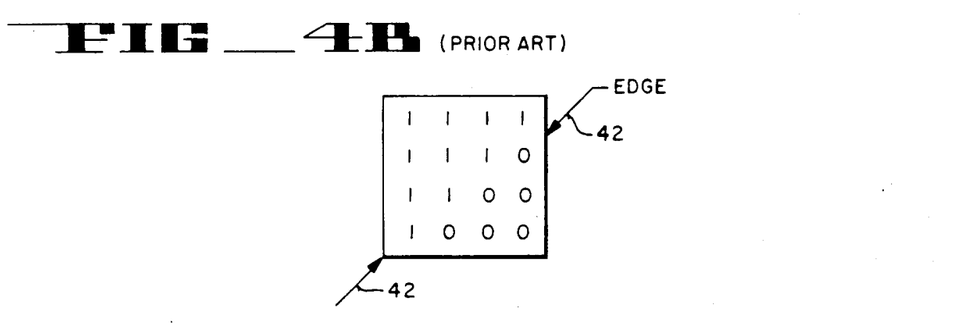
FIG. 4B illustrates a 4×4 block of pixels with a bitmap distributed in the block, this diagram is used to illustrate a problem with the prior art method.

There is a problem which occurs with the encoding described in the previous paragraph for the two color block which is described in conjunction with FIG. 4B.

Figure 5A:
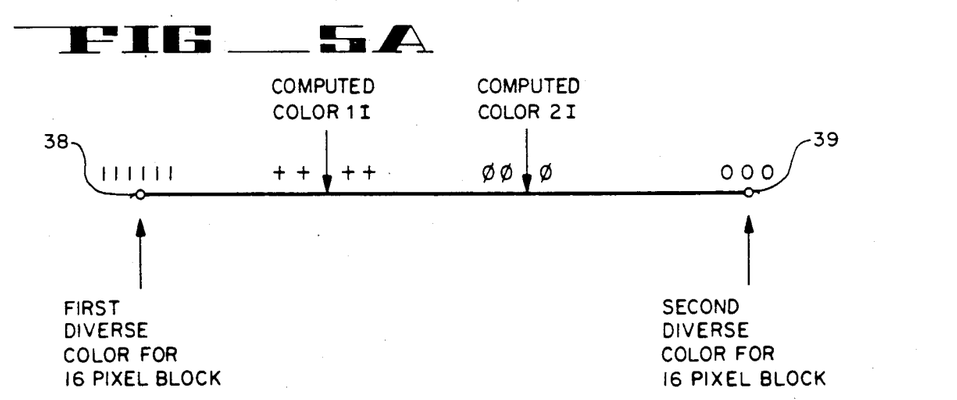
FIG. 5A is a diagram illustrating a novel type of compression used in the adapted method of the present invention. This compression type uses a double bitmap for selecting between four colors.
Figure 5B:
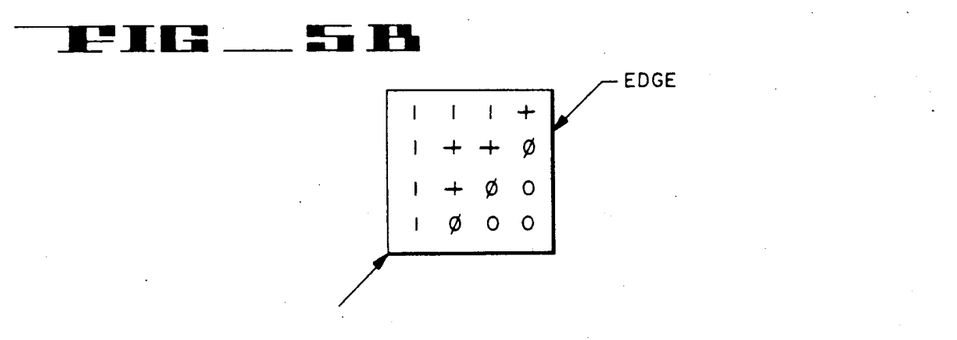
FIG. 5B is a diagram illustrating a 4×4 block with a double bitmap distributed in the block. This illustrates how the novel compression of FIG. 5A solves the problem illustrated in FIG. 4B.

In the currently preferred method, where the two diverse colors are separated by a threshold amount which may be a fixed amount or an amount adjusted by the user, a different type of encoding is used. This type of encoding is indicated in the first word by the code "11". In effect, the block of pixel data is represented by four colors and a 32 bit (double) bitmap. The bitmap indicates which one of the four colors is to be used for each pixel on decoding. Importantly, four colors are not in fact stored, but rather, only two colors are stored. The second two colors (intermediate colors) are computed. For this type of coding, 64 bits are used for each 4×4 block. The first word leads with the code "11" to indicate the type of encoding, followed by 14 bits representing the first color. The second color is represented by the following 16 bits and finally, 32 bits representing the double bitmap. This type of encoding, described in more detail in conjunction with FIGS. 5A and 5B, provides anti-aliasing which will be better understood when the problem associated with the prior art (FIG. 4B) is discussed. Also this encoding provides excellent results when used to compress all the color data.

COMPRESSION/ENCODING METHOD OF THE PRESENT INVENTION

Referring now to FIG. 3, the method of the present invention, particularly as it relates to the adaptive encoding is described.

As indicated by step 12 for each block of pixel data (e.g., 4×4 block of pixels) two diverse colors for the block are determined. In the currently preferred method, these colors are determined by first converting the RGB values associated with each of the pixels into their corresponding luminance value. Luminance may be determined for NTSC systems from the equation $$Y = 0.299R + 0.587G + 0.114B$$

The average or mean luminance is then computed for the 16 pixels. The luminance for each pixel is compared with the mean luminance. The average RGB values for the pixels having luminance values above the mean value is determined and this RGB value is one of the diverse colors. The average RGB values for the pixels having luminance values below the mean value is also determined and this RGB value is the other of the diverse colors.

As indicated by step 13, the closeness of the two diverse colors is considered. If the colors are very close (as determined, by way of example, by their Y value), they may be considered a single color. A fixed threshold value or a user selected threshold value may be used to determine whether the two diverse colors are to be considered one color or two colors (this threshold value is shown as T1 in FIG. 9). Line 15 of FIG. 3 illustrates the steps used if the difference between the two colors is considered to be less than the threshold value (i.e., the colors are close) and line 14 indicates the path where the colors are considered to be different (i.e., greater than the threshold value).

In the consideration of the threshold value in this application, the case where the difference in colors is equal to the threshold value is not discussed. Discussions in the method are shown based on "greater than" or "less than" the threshold value. It is a somewhat arbitrary decision to decide in a particular implementation that where the difference in colors is equal to the threshold value, it should be treated as either greater than the threshold or less than the threshold value.

Figure 2:
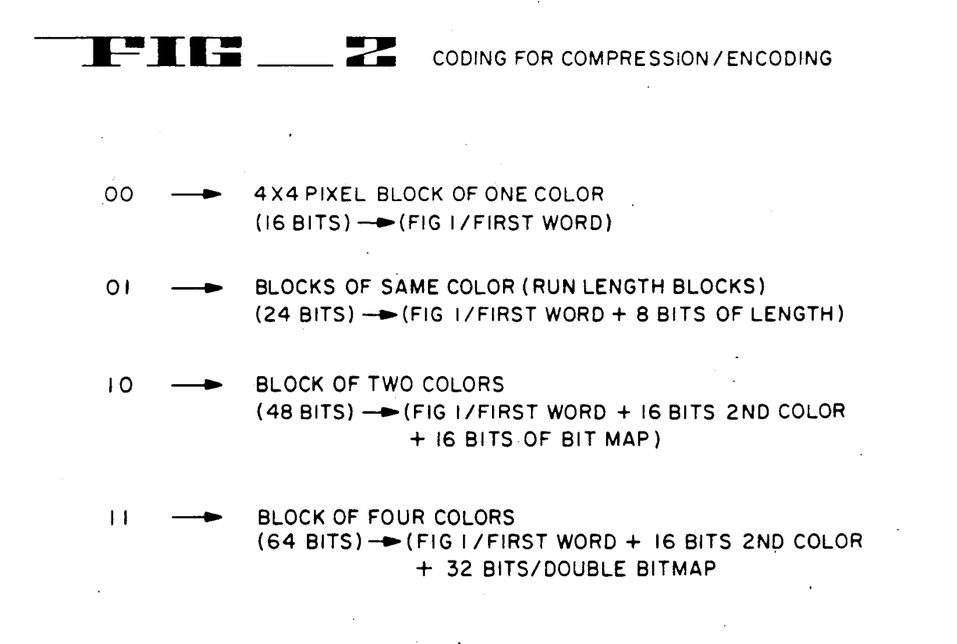
FIG. 2 is a listing of the two bits used to indicate the type of compression or encoding and the resultant compressed data stored for each type of compression.

Assume that for a partcular block of pixel data, the difference between the colors is less than the threshold T1 (line 15). For this case, the block of pixels under consideration is stored as a single color with a type code "00" as indicated in FIG. 2, or with a type code "01" for a run of the same color blocks.

As shown in step 18, the type code for the last considered block is examined to determine if the type of compression was "00" or "01". Assume first that it is not either of these types of compression. Then following the "N" (no) line, step 19 applies; that is, the pixel data for the block is stored as a single color preceded by the code "00".

If, on the other hand, the last block was a "00" or "01" type compression, following the "Y" (yes) line, step 21 applies. The color of this previously considered block is examined and compared to the color of the block under consideration. In practice, the compressed data for the previous block can be accessed from memory or this data can be retained in a register until it is determined that the run of blocks has ended or that the number 256 has been reached for the 8 bit run instruction.

The color for the current block and the previous block are compared. Once again, a fixed threshold value or a user settable threshold value can be used to reach a determination as to whether the colors are different or the same. (This threshold value is shown as T2 in FIG. 9).

Assume now that as a result of step 21, the difference in colors is less than threshold 2. As indicated by step 22, a run instruction is started or updated. That is, if the data for the previously stored block is stored under the code "00", the code is changed to "01" and 8 bits are added and coded to indicate that this is the second block of the same color. If the data for the previously stored block is already stored under the coding of "01" the run length field is updated to indicate another block of the same color. The data as indicated by block 23 is stored under the compression type "01".

If the difference in color as determined by step 21 is greater than the threshold 2 indicating that the color of the current block is different than that of the previously stored block, the new color is stored for the block under the code "00" as indicated by step 25.

Consider now what occurs if the results of steps 13 indicate that the colors are greater than threshold 1 as indicated by the path 14. As indicated by step 27, the difference between the colors is again considered to determine whether the difference is greater than or less than a third threshold. Once again, this third threshold may be a fixed set value or one selectable by the user. If the difference between the two colors is greater than the third threshold, the block is stored as two colors and a double bitmap as indicated by blocks 31 and 33. If the colors are less than the threshold 3, the data for the block is stored as two colors and a single 16 bit map as indicated by steps 28 and 29.

The specific computation used to compute the 16 bitmap of step 28 is discussed later in this application. In general, the luminance associated with each pixel is compared to the mean luminance for the 16 pixels in the block. If the luminance for a particular pixel is below the mean value, one binary state is stored for the pixel, whereas if the luminance is above the mean value, the other binary state is stored for the pixel. These two states determine which one of the two diverse colors is used on decoding. More specifically, if the luminance value for a particular pixel is less than the mean value, then the diverse color computed from those pixels with values below the mean luminance is associated with that pixel. On the other hand, if the luminance value for a particular pixel is above the mean value, then the other diverse color is associated with that pixel. As shown by step 29, the data for this block is stored with the header "10".

The computation for the double bitmap as shown by step 31 is discussed in more detail later in this application. In general, in the currently preferred embodiment the two diverse colors are first used to determine two extended diverse colors. Then, two intermediate colors are computed. The luminance for each pixel is then compared to the 4 colors and for each pixel, 2 bits are used to associate which of the 4 colors most closely matches a particular pixel's color. The result of this consideration provides the 32 bit double bitmap for the 4×4 block of pixels. Only two colors, for example, the two extended diverse colors are stored along with the 32 bits fo the bitmap under the heading "11" as indicated by step 33. On decoding, the two intermediate colors are recomputed from the extended diverse colors and the double bitmap is used to select one of the four colors for each of the pixels.

PROBLEM ASSOCIATED WITH THE PRIOR ART COMPRESSION (TYPE "10")

As previously mentioned, the type of compression identified in this application by the code "10" is described in U.S. Pat. No. 4,580,134. This technique is illustrated in FIG. 4A. First, the luminance for each of the 16 pixels is computed and a mean or average luminance is determined. The average luminance is shown by line 40 in FIG. 4A. The first diverse color shown by point 38 is the color associated with the lower luminance colors. The second diverse color, point 39, is the color associated with the higher luminance colors.

Those pixels with luminance less than the mean are shown by "1"; the pixels having a luminance greater than the mean are shown by "0". In the distribution of the pixels of FIG. 4A, seven of the pixels are closer to the mean luminance than the other 9 pixels (four of the "closer" pixels are to the left of the mean value and three are to the right of the mean value). The remaining pixels are closely distributed either near point 38 or point 39. In FIG. 4B, the distribution of these colors is shown in the 4×4 block. The upper part of the block on decoding has one color and the lower part of the block another color. These two colors define an edge or interface 42. Unfortunately, since the colors are relatively far apart for the example shown, the interface between the colors in the block will be "hard" and "ragged". The problem, of course, becomes worse as the difference in the colors becomes greater. One solution to this problem suggested by the prior art is to determine and store 4 colors and to use double bitmaps (see column 5, beginning at line 14 of U.S. Pat. No. 4,580,134). The unique solution used in the present invention is described below.

ANTI-ALIASING CODING (TYPE "11")

Referring to FIG. 5A, assume the two diverse colors are the same as for FIG. 4A (colors 38 and 39) and that the distribution of colors is the same as in the example of FIG. 4A and 4B. In the currently preferred embodiment, two additional colors (intermediate colors) color 1I, and color 2I, are computed from the diverse colors 38 and 39. Then, the luminance associated with each pixel is compared to the luminance of each of the four colors, and each pixel is assigned the color it is closest to. This assignment or association of one of four colors to each pixel requires 2 bits per pixel. In FIG. 5A, the pixels closest to color 38 are represented by "1", the pixels closest to color 1I by "+", the pixels closest to color 2I by "∅", the pixels closest to color 39 by "0".

In FIG. 5B, the distribution of the colors is shown for the 4×4 block. In comparing FIGS. 4B and 5B, it should be noted that in both cases in the upper lefthand corner of the block, the predominant color is color 38 and in the lower righthand corner of the block, the predominant color is color 39. However, in FIG. 5B, the intermediate colors are distributed along the interface, in effect, softening the transition or more specifically providing the anti-aliasing of this coding compression technique. The currently preferred embodiment of this technique is described in conjunction with FIGS. 6 and 7.

PREFERRED METHOD FOR TYPE CODE 11

Figures 6, 7:
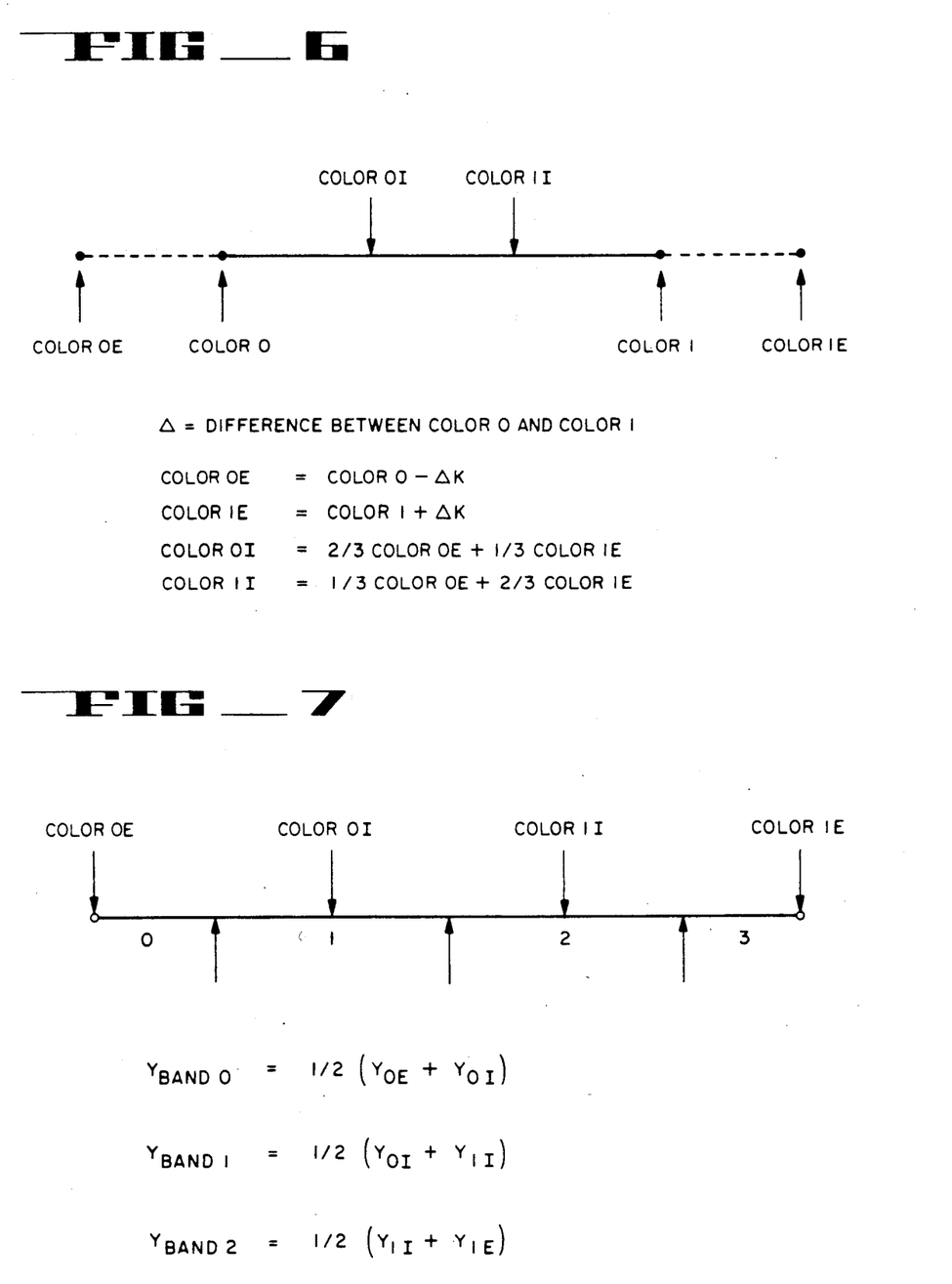
FIG. 6 is a diagram illustrating another novel aspect of the one type of compression used in the overall method of the present invention. In particular, two diverse colors are extended.
FIG. 7 is a diagram illustrating how a double bitmap is formed when the extended diverse colors of FIG. 6 are used.

In FIG. 6, the diverse colors previously discussed are shown as "color 0" and "color 1". As mentioned, these colors may be determined by averaging all those colors below a mean value and all those colors above the mean value. In the currently preferred method, these two diverse colors are extended when the double bitmap is used. The extended colors are shown as color 0E and color 1E. The extended colors are determined by first finding the difference between color 0 and color 1. The extended color—color 0E, is the color 0 less the difference times a constant K. And similarly, the color 1E is equal to the color 1 plus the "difference" times the constant "K". The colors 0E and 1E are computed in RGB space, that is, the extending factor "ΔK" is applied separately to R, G and B. In the currently preferred embodiment, K is equal to 0.125.

Next the intermediate colors shown in FIG. 6 as color 0I and color 1I are computed. The formulas for computing these colors in the currently preferred embodiment are also shown in FIG. 6. This computation is also performed in RGB space.

Once these four colors are determined, it is now necessary to determine the closest color for each pixel. This is done by dividing the "color space", that is, space between color 0E and color 1E into four bands 0, 1, 2 and 3 as shown in FIG. 7. In the currently preferred embodiment, this computation is done in the luminance space. Band 0 as shown in FIG. 7, is equal to ½ the luminance associated with color 0E and color 0I. Similarly, the Y band 1 is equal to ½ the luminance associated with color 0I and ½ the luminance associated with color 1I. If, by way of example, the luminance for a particular pixel is below the luminance for Y band 0, that pixel is assigned to color 0E. If the luminance is between Y band 0 and Y band 1, it is assigned the color 0I. Similarly, if it is between Y band 1 and Y band 2, it is assigned the color 1I, and finally, if it is above Y band 2, it is assigned color 1E. Two bits are used to represent each of these colors, and hence, a 32-bit bitmap is prepared, representing which one of the four colors is associated with each of the pixels.

Figure 11:
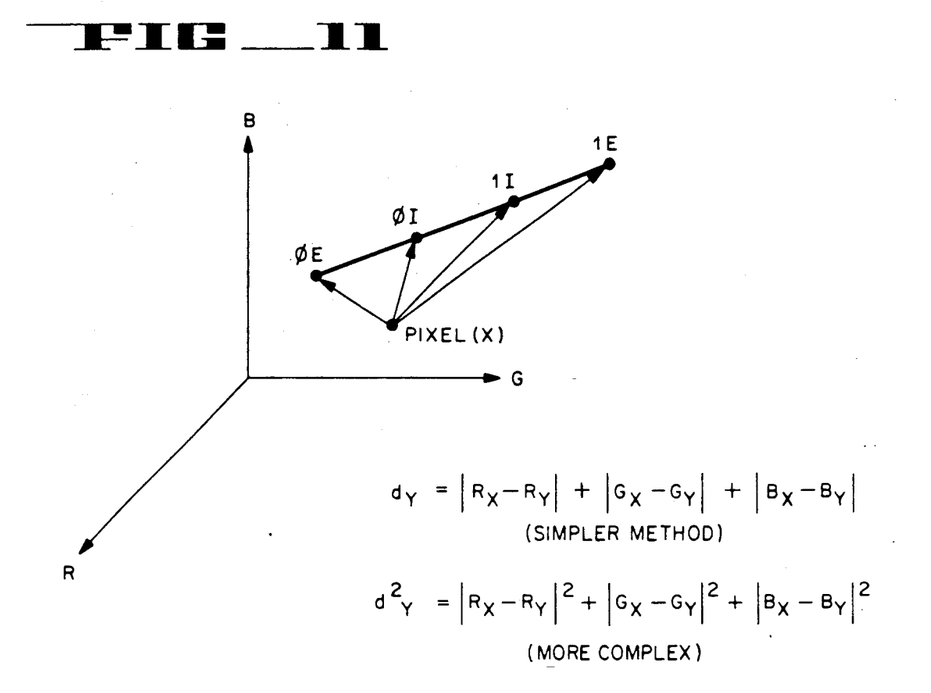
FIG. 11 is a diagram illustrating the method used for determining the closest color in RGB space.

Alternately, the appropriate color can be selected in RGB space. In FIG. 11 the extended diverse colors and the computed intermediate colors are shown disposed along a line in RGB space along with a pixel X. Assume this pixel is one of the 16 pixels in a block. The RGB values of this pixel determine its location in the RGB space. Note that the pixel does not fall on the line defined by the extended diverse colors. This is to be expected since these colors were determined by an averaging process. The distance from pixel X to each of the colors (two extended diverse colors and two intermediate colors) is computed in this three dimensional space. The color closest to pixel X is the color which is selected for the pixel. This is done for each of the pixels in the block.

FIG. 11 illustrates two equations which may be used to determine the distance $d_y$ from the pixel to each of the colors. In the simpler method, the absolute values of the differences between the red, green and blue components of the pixel under evaluation and the RGB values for each color is determined and the sum considered as the distance. A more rigorous determination of the distance is also shown in the second equation of FIG. 11 where the differences in the red, green and blue components are squared, summed and the square root of the sum used as representing the distance.

EXTENSIONS TO ANTI-ALIASING CODING

Previous discussions in this application have emphasized the use of a 4×4 block and the 32-bit bitmap for the type 11 coding. Moreover, the discussions have been directed towards an adaptive system which uses one of a plurality of different coding techniques.

The type 11 coding can be used with excellent results as the only coding mode in a compression/decompression system. That is, all of the video data can be compressed, stored and decompressed using the type 11 compression. Note when this is done the two bits indicating the type of compression are not needed and, for example, where 24 bits are used to represent the compressed data, 8 bits can be used for R, 8 bits for G and 8 bits for B.

Figure 12:
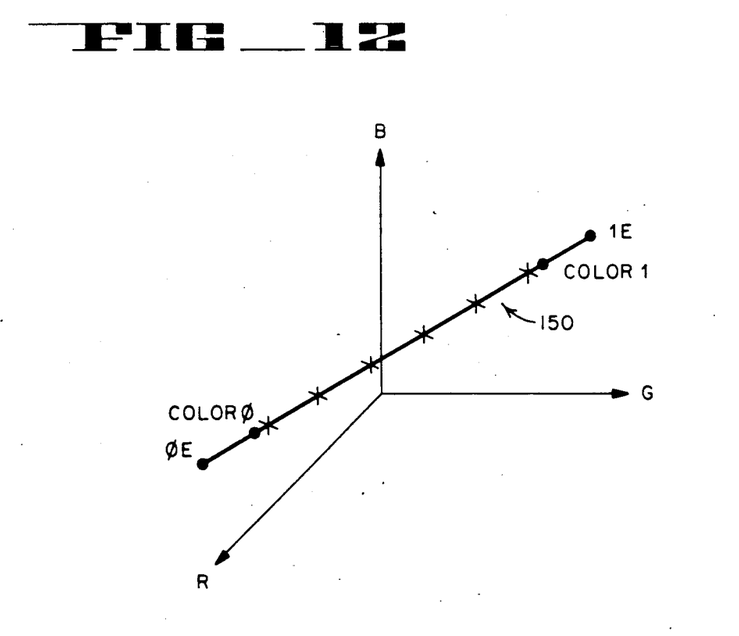
FIG. 12 is a diagram illustrating a plurality of intermediate colors, the diverse colors and the extended diverse colors in RGB space.

Previously, discussions have centered on computing two intermediate colors. In fact, any number of intermediate colors can be computed by simply computing equal distances along the line between either the diverse colors or, as currently preferred, the extended diverse colors. In FIG. 12 a line 150 is shown in RGB space which extends between the extended diverse colors. Six X's (along the line along with the extended diverse colors) are used to illustrate an example where 8 total colors are used to represent a 4×4 block. In this case, three bits per pixel are required in the bitmap to identify which one of the 8 colors is associated with each of the pixels. Once again, the appropriate color for each pixel may be selected in RGB space as shown in FIG. 11 or in the luminance domain as previously described. A 4×4 block can also be represented with 14 intermediate colors for a total of 16 colors and a 4-bit per pixel bit map (64 bits for the 4×4 block). Note that in each of these representations only two colors are stored and all the other colors, the intermediate colors, are computed. Thus, the additional storage required is for the bitmap only.

Blocks of 8×8 pixels have also been successfully represented with this technique. For instance, two extended diverse colors and two intermediate colors and a 128-bit bitmap can be used to represent the 8×8 block. Particularly good results have been obtained where a 3 bit per pixel bitmap is used along with 6 intermediate colors (192-bit bitmap) for an 8×8 block. Alternately, for better definition 14 intermediate colors can be used and a 256-bit bitmap. Once again, as in the previous case, only 2 colors are stored and the intermediate colors computed on decompression.

DECOMPRESSION/DECODING METHOD

Figure 8:
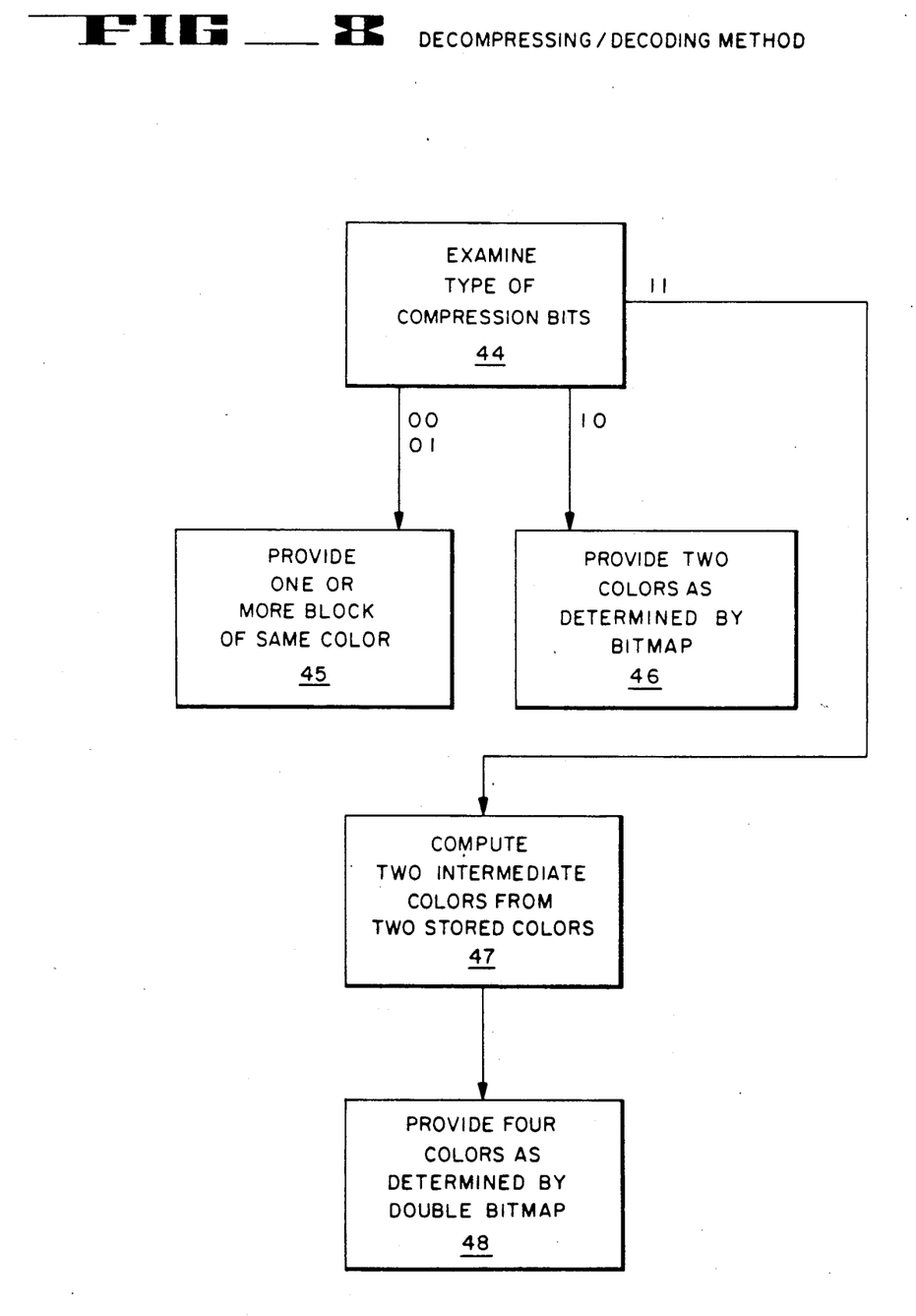
FIG. 8 is a diagram illustrating the decompression or decoding method of the present invention.

In FIG. 8, the method for decompressing/decoding is illustrated. In step 44, the encoded data is examined first to determine the type of coding used. If the type of coding is either 00 or 01, then one or more blocks of the color associated with the code is duplicated for the 16 pixels of each of the blocks (step 45). On the decoding, as well as the encoding, 4 scan lines are encoded/decoded at one time, thus, by way of example, temporary storage for 4 complete scan lines is used.

If the type of compression is "10", the two colors are gated into the memory storing the 4 lines of 4 scan lines under control of the bitmap. This step is indicated by step 46.

Finally, if the coding type is "11", then the two intermediate colors are first calculated (step 47) and the double bitmap is used to gate the 4 colors into the buffer to form the 4×4 block, as indicated by step 48. The equation shown in FIG. 6 for color 0I and Color 1I are again used.

APPARATUS FOR PERFORMING THE INVENTED COMPRESSION

As previously mentioned, the invented compression and decompression may be performed in a general purpose computer, such as a microprocessor, under control of a program. Ordinary programming may be used to implement the invented method. The compression and decompression may also be performed by "hardwired" logic. An apparatus for performing the compression is shown in FIG. 9 and an apparatus for performing the decompression is shown in FIG. 10.

Figure 9:
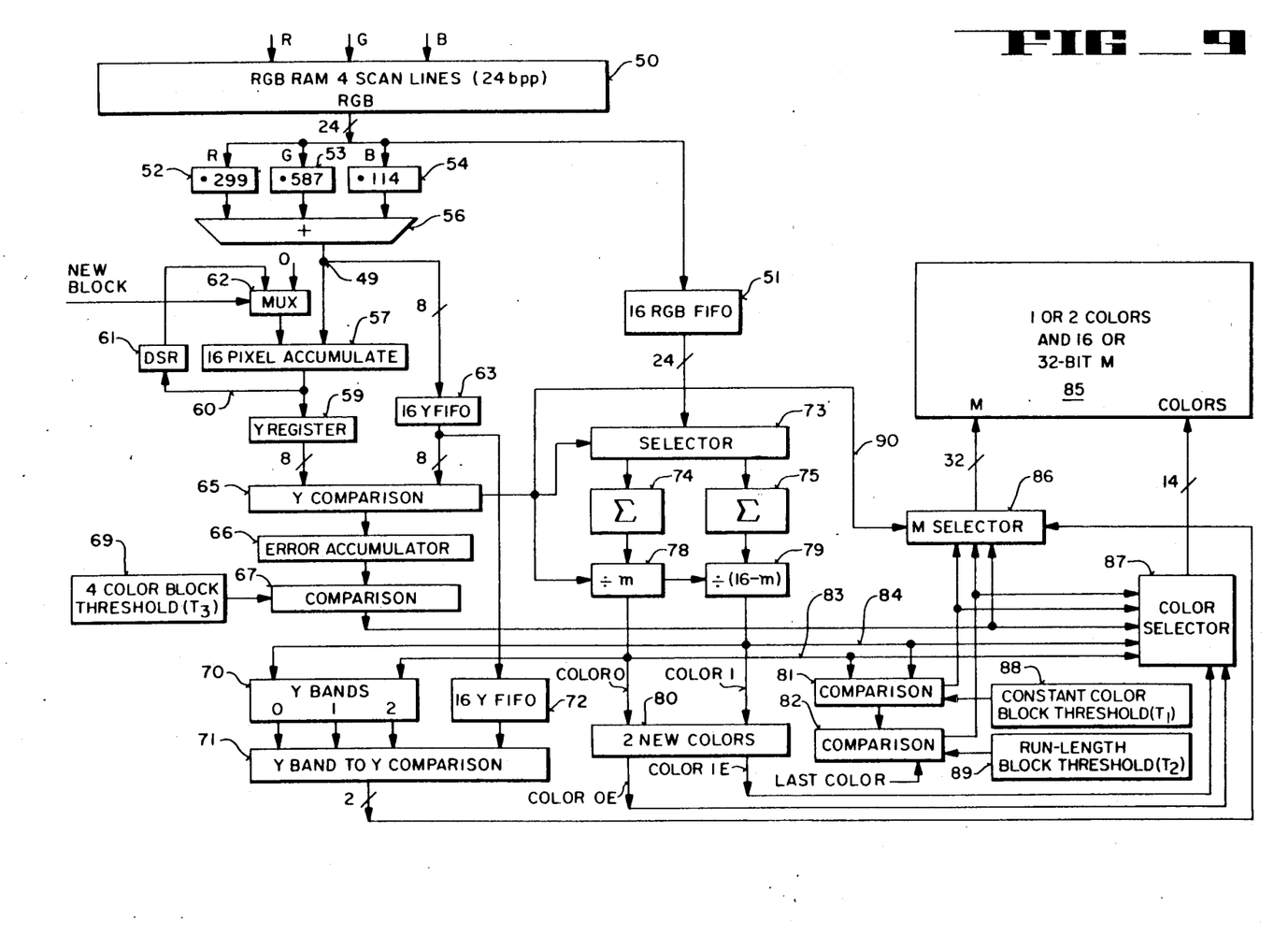
FIG. 9 is a block diagram of an apparatus for implementing the compression of the present invention.
Figure 10:
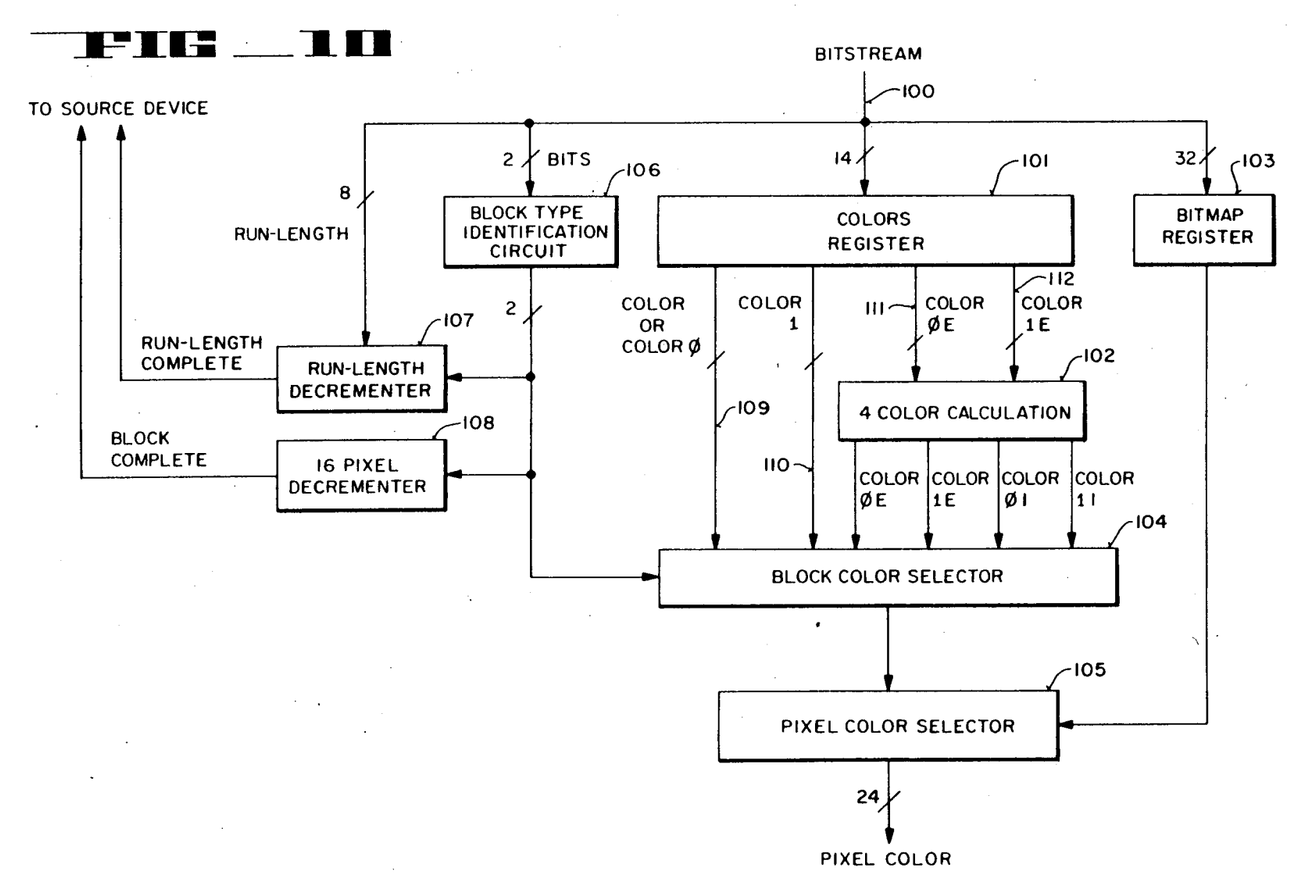
FIG. 10 is a block diagram of an apparatus for implementing the decompression of the present invention.

In FIG. 9, a buffer 50 stores four scan lines of a raster scanned display. For the described embodiment, each pixel is 24 bits deep (RGB data). The apparatus of FIG. 9 considers one 4×4 pixel block at a time, and after the data for that block has been compressed, goes on to consider the next block in the direction of the scan.

The bits representing each pixel for each block are read from the buffer 50 through the multipliers 52, 53 and 54. These multipliers multiply the red signal by 0.299, the green signal by 0.587 and the blue signal by 0.114. The output of the multipliers of 52, 53 and 54 are summed in summer 56 and the results of this summation (on line 49) is the luminance. This luminance is computed pixel-by-pixel and accumulated in the accumulator 57. The path 60 and register 61 allow accumulation through the multiplexer 62 to be averaged (divided). Moreover, after each block the multiplexer 62 allows the accumulator 57 to be "zeroed". The Y register 59 then stores the average luminance for the pixels in the block. The luminance value for each pixel (on line 49) is stored in the first-in, first-out register 16. The Y comparator 65 compares the average value of the luminance (from register 59) with the luminance of each of the pixels (from the register 63). The results of this comparison provide a control signal to control the selector 73. Also, the signal on line 90 is a bitmap for the type 10 comparison and can be stored in memory 85. This bitmap is used if it is determined that the block is to be compressed with type 10 compression.

The actual RGB values for each of the pixels are stored in the first-in, first-out register 51. The output of this register provides an input to the selector 73. If the results of the comparison from the comparator 65 show that a particular pixel's luminance is below the mean, the output from the register 51 is directed into the summer 74. Otherwise, the output from the register 51 is directed into the summer 75. After all the values from the register 51 have been summed in either the summer 74 or 75, the output of these summers are divided by the dividers or shifters 78 or 79. The signal at the output of the comparator 65 is used by the shifters 78 and 79 as a "count". That is, by way of example, if the selector 73 has directed the pixel data for 10 pixels into summer 74, and six into summer 75, shifter 78 divides the output of summer 74 by 10 and shifter 79 divides the output of summer 75 by 6. The output of the summers 78 and 79 are the diverse colors, color 0 and color 1, respectively.

The color 0 (on line 83) and color 1 (on line 84) are applied to a comparator or comparison means 81. This comparison means receives the first threshold value (T1 from block 88). (This comparison can be done either in the luminance space by comparing the luminance of the two colors or in RGB space by accumulating the difference between the RGB values for the two colors. Other criteria may be used to determine the difference (or closeness) between two colors. For example, red may be given more or less weight for a particular display). If the difference of the colors on the lines 83 and 84 are less than the threshold value T1, the comparison means 81 so indicates to the color selector 87, and then the colors on the lines 83 and 84 are directed to memory 85. In this event, the comparison means 82 compares the color stored for the last block (assuming it was a single color) with the current color. If these colors are less than threshold 2 (T2 is stored in the block 89) then a run instruction is needed. The output of the comparison means 82 directs the M selector 86 to either begin a run instruction or update the last run instruction.

For the illustrated embodiment, the difference between the mean luminance value from register 59 and each of the luminance values for the pixels is accumulated from the comparator 65 in an error accumulator 66. If the results of this accumulation, as determined by the comparison means 67, exceeds the threshold T3 (stored in block 69), the output of the comparison means 67 signals the color selector 87 and the selector 86 to indicate double bitmap and extended colors will be stored. This is a different way for selecting between "10" and "11" codings than previously discussed. The extended colors are computed by the new color block 80 using the equations shown in FIG. 6. These colors are selected by the color selector 87 for storage in memory 85. The three Y band luminance values shown by the equations in FIG. 7 are computed by the Y bands block 70. These values can be determined either directly from the RGB values on lines 83 and 84 or from the output of the block 80 when coupled through the color selector 87 to block 70.

The output of the FIFO register 63 is coupled to another FIFO register 72. The luminance for each pixel is thus available for comparison in the Y band to Y comparison means 71 to see which of the bands each pixel falls into. Two bits are provided at the output of comparison means 71 for each pixel which bits are coupled through the map selector 86 to memory 85.

DECOMPRESSING APPARATUS OF FIG. 10

The bitstream from the memory storing the compressed data is coupled to the bus 100 of FIG. 10. The "type" bits indicating the type of compression are selected from the bus and coupled to the block type identification circuit 106. Those bits representing color are coupled to the color register 101. Those bits representing the bitmap are coupled to the bitmap register 103. For type 00 and 01 compression a single color is coupled to lines 109. For type 10 compression, the two diverse colors, color 0 and color 1, are coupled to the lines 109 and 110, respectively. In the event that the block is type 11 compression, then the two extended colors from the register 101 are coupled to a calculating means 102 via the lines 111 and 112. The four color calculator 102 computes the intermediate colors, again using the equations shown in FIG. 6. The block color selector 104 is a multiplexer which under the command of the identification circuit 106 selects either the single color, two colors from lines 109 and 110, or four colors for the type 11 encoding. The bitmap data controls selector 105. Selector 105 selects the appropriate color for both the two color and four color cases.

Where the identification circuit 106 detects type 01 coding, the 8 bit run length instruction is stored in the decrementer 107. The output of the decrementer 107 assures that the output of the selector 105 (single color) is repeated for all 16 pixels in the block, and for as many blocks as indicated by the run length instruction.

A 16 bit decrementer 108 counts 16 pixels for each block to indicate when a block is completed. This permits the new data to be coupled to the apparatus of FIG. 10.

The compressing and decompressing apparatuses of FIGS. 9 and 10 may be realized with ordinary components.

Thus, a compression and decompression technique has been described which provides adaptive compression, with the amount of compression being controllable by a user. For the 16 bit words discussed, the type 00 compression provides a 24 to 1 compression ratio. The type 01 compression provides typically substantially more than 24 to 1 compression depending on the number of consecutive blocks of the same color occur. The type 10 compression provides 8 to 1 compression, while the type 11 compression provides 6 to 1 compression. For typical non-text images, compression with the disclosed system can be expected to be in the range of 8–15 to 1.

We claim:

1. A method for compressing digital video color data comprising the steps of:

considering the video data in blocks of $n \times n$ pixels;

determining two diverse colors for each of said blocks by examining the $n^2$ pixels in each of said blocks;

determining if the difference in said two diverse colors for each of said blocks is greater than a first threshold value, and if said difference is greater than said first threshold value, representing said block with four colors and a 2 $n \times n$ bitmap, two of said four colors being intermediate colors calculated from said two diverse colors, said bitmap for selecting among said four colors, if said difference is less than said first threshold value, representing said block as one color.

2. The method defined by claim 1 wherein, if said one color for a plurality of adjacent ones of said blocks are different by less than a second threshold value, representing said adjacent blocks by a single color and an instruction representing the number of said adjacent ones of said blocks.

3. The method defined by claim 1 wherein said step of determining said two diverse colors comprises the steps of:

determining the mean luminance of said $n^2$ pixels in each of said blocks;

computing one diverse color by averaging the colors of those of said pixels having a luminance greater than said mean luminance;

determining the other of said diverse colors by averaging the one of said pixels having a luminance less than said mean luminance.

4. A method for compressing digital video color data comprising the steps of:

considering the video data in blocks of $n \times n$ pixels;

determining two diverse colors for each of said blocks by examining the $n^2$ pixels in each of said blocks;

comparing the difference in said two diverse colors for each of said blocks with a threshold value;

if said difference is greater than said threshold value, computing two intermediate colors from said diverse colors and computing a 2 $n \times n$ bitmap said 2 $n \times n$ bitmap for selecting among said two diverse colors and said two intermediate colors;

if said difference is less than said threshold value, representing said block as two colors and an $n \times n$ bitmap.

5. The method defined by claim 4 wherein said step of determining said two diverse colors comprises the steps of:

determining the mean luminance of said $n^2$ pixels in each of said blocks;

computing one diverse color by averaging the colors of those of said pixels having a luminance greater than said means luminance;

determining the other of said diverse colors by averaging the one of said pixels having a luminance less than said mean luminance.

6. A method for compressing digital video color data comprising the steps of:
considering the data in blocks of n×n pixels;
determining two diverse colors for each of said blocks by examining the $n^2$ pixels in each of said blocks;
determining if the difference in said two diverse colors for each of said blocks is greater than a first threshold value;
determining if the difference in said two diverse colors for each of said blocks is greater than a second threshold value;
if said difference is greater than said first threshold value, representing said block as two colors and an n×n bitmap;
if said difference is greater than said second threshold value then:
determining two extended diverse colors;
determining two intermediate colors;
preparing a bitmap representing the closest one of said two extended diverse colors and said two intermediate colors for each of said pixels in said n×n block.

7. A method for compressing digital video color data for an n×n block of pixels comprising the steps of:
determining two diverse colors by examining said color data for said pixels in said n×n block;
calculating from said two diverse colors a plurality of intermediate colors falling between said two diverse colors;
determining the closest one of said two diverse colors and said plurality of intermediate colors for each of said pixels in said n×n block;
preparing a bitmap representing said closest one of said two diverse colors and said plurality of intermediate colors for each of said pixels in said n×n block.

8. A method for compressing digital video color data for an n×n block of pixels comprising the steps of;
determining two diverse colors by examining said color data for said pixels in said n×n block;
determining two extended diverse colors from said two diverse colors;
determining a plurality of intermediate colors falling between said two extended diverse colors;
determining the closest one of said two extended diverse colors and said plurality of intermediate colors for each of said pixels in each of said n×n block;
preparing a bitmap representing said closest one of said two extended diverse colors and said plurality of intermediate colors for each of said pixels in said n×n block.

9. The method defined by claim 8 wherein n is equal to 4, 2 intermediate colors are used and wherein said bitmap representation comprises 32 bits.

10. The method defined by claim 8 wherein n is equal to 4, 6 intermediate colors are used and wherein said bitmap representation comprises 48 bits.

11. The method defined by claim 8 wherein n is equal to 4, 14 intermediate colors are used and wherein said bitmap representation comprises 64 bits.

12. The method defined by claim 8 wherein n is equal to 8, 2 intermediate colors are used and wherein said bitmap representation comprises 128 bits.

13. The method defined by claim 8 wherein n is equal to 8, 6 intermediate colors are used and wherein said bitmap representation comprises 192 bits.

14. The method defined by claim 8 wherein n is equal to 8, 14 intermediate colors are used and wherein said bitmap representation comprises 256 bits.

15. The method defined by claim 8, including the step of storing said compressed digital video color data by storing said 2 extended diverse colors and said bitmap.

16. The method defined by claim 8, including the following steps for decompressing said compressed digital video color data;
redetermining said plurality of intermediate colors from said two extended diverse colors;
selecting from said two extended diverse colors and said plurality of intermediate colors a color for each pixel in said n×n block as a function of said bitmap.

17. The method defined by claim 8, including the following steps for decompressing said compressed digital video color data;
redetermining said plurality of intermediate colors from said two diverse colors;
selecting from said two diverse colors and said plurality of intermediate colors a color for each pixel in said n×n block as a function of said bitmap.

18. An apparatus for compressing digital video color data comprising;
a buffer for storing n scan lines of pixel data;
first computational means for determining for each n×n block of pixels in said buffer two diverse colors, said first computational means being coupled to said buffer;
second computational means for determining for each n×n block of pixels two extended diverse colors, said second computational means coupled to said first computational means.
register means for storing a color threshold value;
comparator means coupled to said storage means and said first computational means for determining if the difference between said diverse colors is greater than said color threshold value;
storage means for storing each n×n block as two extended diverse colors and a bitmap if the output of said comparator means indicates that the difference in said two diverse colors is greater than said color threshold value, and for storing each n×n block as a single color if the output of said comparator means indicates that the difference between said two diverse colors is less than said color threshold value, said storage means being coupled to said second computational means and said comparator means.

19. A method for compressing digital video color data for storage or transmission comprising the steps of:
considering the video data in blocks each having an equal number of pixels;
determining if the color differences among the colors in each block are greater than a predetermined amount;
if said differences are greater than said predetermined amount, representing said block by two representative diverse colors and at least two intermediate colors computed from said two diverse representative colors, and bitmap data to select the closest color for each color in each block from among said two representative diverse colors and said intermediate colors;

if said differences are less than said predetermined amount representing said block as one color.

20. The method defined by claim 19 wherein if said one color for a plurality of adjacent ones of said blocks is approximately the same, representing said adjacent blocks by a single color and an instruction indicating the number of said adjacent blocks.

21. The method defined by claims 19 or 20 wherein said intermediate colors are discarded prior to said storing or transmission.

22. The method defined by claim 21 wherein said two representative diverse colors are extended diverse colors.

23. The method defined by claim 22 wherein each of said blocks are 4×4 blocks.

24. The method defined by claim 23 wherein said selection of said closest color to said two representative diverse colors and said intermediate colors for said bitmap data occurs by examining the luminance values of said representative diverse colors and said intermediate colors, and the luminance value of the color associated with each pixel.

25. A method for compressing digital video color data for storing or transmission, comprising the steps of:
considering the video data in blocks each having an equal number of pixels;
determining two representative diverse colors for each block by examining the video data in each of said blocks;
representing said block by said two representative diverse colors and at least two intermediate colors computed from said two representative diverse colors and bitmap data which indicates the closest color for each color in each block to said two representative diverse colors and said intermediate colors;
discarding said intermediate colors prior to said storing or transmission.

26. The method defined by claim 25 wherein said two representative diverse colors are extended diverse colors.

* * * * *